United States Patent
Schmalzl

(10) Patent No.: US 6,953,818 B2
(45) Date of Patent: Oct. 11, 2005

(54) PRODUCING PIGMENTED POWDER COATING MATERIALS

(75) Inventor: Manfred Schmalzl, Gablingen/Lü (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/798,862

(22) Filed: Mar. 1, 2001

(65) Prior Publication Data

US 2001/0031809 A1 Oct. 18, 2001

(30) Foreign Application Priority Data

Mar. 1, 2000 (DE) .......................... 100 09 753
May 24, 2000 (DE) .......................... 100 25 680

(51) Int. Cl.$^7$ .............................................. C08K 5/10
(52) U.S. Cl. ..................... 524/230; 524/318; 524/394
(58) Field of Search ................. 524/230, 318, 524/394; 106/400

(56) References Cited

U.S. PATENT DOCUMENTS

| | | | |
|---|---|---|---|
| 3,969,547 A | | 7/1976 | Isawa et al. |
| 4,042,550 A | * | 8/1977 | Tuller ......................... 260/280 |
| 4,046,727 A | * | 9/1977 | Itoh et al. .................... 523/220 |
| 4,097,435 A | * | 6/1978 | Rawlings ...................... 260/28 |
| 4,283,426 A | * | 8/1981 | Schenk ....................... 426/105 |
| 4,435,466 A | * | 3/1984 | Kuhnel ........................ 428/215 |
| 5,047,259 A | * | 9/1991 | Oberkobusch et al. ......... 427/27 |
| 5,155,150 A | * | 10/1992 | Kohler ......................... 524/94 |
| 5,188,765 A | | 2/1993 | Ehrhardt |
| 5,207,802 A | | 5/1993 | Baumann |
| 5,310,823 A | * | 5/1994 | Kunitomi ..................... 525/400 |
| 5,763,515 A | * | 6/1998 | Bertelo ........................ 524/493 |
| 5,998,354 A | | 12/1999 | Turowski-Wanke et al. |
| 6,015,626 A | * | 1/2000 | Kopytko ..................... 428/516 |
| 6,063,146 A | | 5/2000 | Miller et al. |
| 6,180,683 B1 | | 1/2001 | Miller et al. |
| 6,204,420 B1 | | 3/2001 | Miller et al. |

FOREIGN PATENT DOCUMENTS

DE 24 39 079 3/1975

OTHER PUBLICATIONS

European Search Report.
U.S. Appl. No. 09/505,364, filed Feb. 16, 2000, Weber et al.
U.S. Appl. No. 09/727,960, filed Dec. 1, 2000, Weber et al.
U.S. Appl. No. 09/993,590, filed Nov. 16, 2001, Krull et al.
U.S. Appl. No. 10/025,262, filed Dec. 19, 2001, Takeuchi et al.

* cited by examiner

Primary Examiner—Edward J. Cain
(74) Attorney, Agent, or Firm—Anthony A. Bisulc

(57) ABSTRACT

The invention relates to a process for producing pigmented powder coating materials using montanic acid esters, amides or salts as dispersants for the pigments, and to the corresponding powder coating materials.

9 Claims, No Drawings

PRODUCING PIGMENTED POWDER COATING MATERIALS

BACKGROUND OF THE INVENTION

The present invention relates to an improved process for producing pigmented powder coating materials using an agent for improving pigment dispersion.

The preparation of powder coating materials by extrusion in corotating twin-screw extruders or single-screw compounders is widely known. Powder coating materials are composed of binders, such as polyester resins, for example, which are crosslinked using, for example, epoxides, triglycidyl isocyanurate (TGIC), β-hydroxyalkylamine, or blocked isocyanates (uretdiones)

pigments and fillers, except in the case of clearcoats. The pigments must have appropriately high thermal stability. Examples are phthalocyanines, quinacridones, azo pigments, perylene and perinone pigments, benzimidazolone pigments, anthraquinone pigments, isoindolinone and isoindoline pigments, anthanthrone pigments, dioxazine pigments, quinophthalone pigments, diketopyrrolopyrrole pigments additives, such as devolatilizers, flatting agents, antioxidants, tribo additives, leveling agents, waxes for improving the scratch resistance, for example.

For the preparation of the powder coating material, all of the constituents are first premixed in a mixer, then homogenized in an extruder or compounder at from 80 to 130° C., and finally brought to the final particle size by grinding and sieving. During the preparation of pigmented systems, it is especially important to disrupt pigment agglomerates into very finely divided form and to disperse pigment aggregates very homogenously indeed in order to obtain the optimum color strength. Nowadays this is done by introducing mechanical energy by way of the screw configuration of the extruders or compounders used, without using a dispersing aid.

SUMMARY OF THE INVENTION

It is an object of the invention to improve pigment dispersion in powder coating materials by the use of an appropriate dispersant. The relative color strength is used as the measure of the improved pigment dispersion.

The invention accordingly provides a process for preparing pigmented powder coating materials, which comprises admixing to the powder coating materials a montanic acid derivative as dispersant.

The invention further provides for the use of montanic acid derivatives as dispersants for pigments for the preparation of powder coating materials.

The invention additionally provides powder coating materials comprising pigments and montanic acid derivatives.

DESCRIPTION OF THE PREFERRED EMBODIMENTS

As dispersants for pigments in powder coating materials, montanic acid derivatives are used. By montanic acids are meant a mixture of carboxylic acids having carbon chain lengths from $C_{22}$ to $C_{36}$, which generally have a dropping point of from 75 to 110° C. (measured in accordance with DGF-M-III 3 (75)), an acid number of from 10 to 160 mg KOH/g (measured in accordance with DGF-M-IV 2 (57)), a saponification number of from 60 to 180 mg KOH/g (measured in accordance with DGF-M-IV 2 (57)), and a density of from 0.99 to 1.03 $g/cm^3$.

Appropriate derivatives of the montanic acids are preferably their esters, amides and salts.

In one preferred embodiment of the invention, the montanic acid derivative is an ester of montanic acid with an alcohol having 1 to 4 OH groups and 2 to 20 carbon atoms. Where said alcohol is a polyol having 2 to 4 OH groups, a carbon atom number of 2 to 8 is particularly preferred. The polyol in question is especially glycerol, ethylene glycol or 1,3-butanediol. Where said alcohol is a monoalcohol, a carbon atom number of 8 to 14 is particularly preferred. In a further preferred embodiment of the invention, the montanic acid derivative is an amide of montanic acid with a monoamine or diamine having 2 to 18, especially 2 to 8, carbon atoms. A particularly preferred diamine is ethylenediamine.

In another preferred embodiment of the invention, the montanic acid derivative is a salt of montanic acid with an alkali metal or alkaline earth metal.

The derivatives of montanic acids are generally prepared by oxidative bleaching of crude montan wax, reaction of the resultant acid wax with an alcohol or amide and/or hydrolysis with an alkali metal hydroxide or alkaline earth metal hydroxide. Waxes of this type have been available commercially for many years. Examples are ® Licowax S (acid wax), Licowax E (ester wax), Licowax OP (partially hydrolyzed ester wax). The preferred use form is powder or micropowder having a particle size of less than 500 μm. The particle size is determined by means of sieve analysis or using a laser diffraction instrument, e.g., from Malvern. The use amount is generally from 0.1 to 10, preferably from 0.5 to 5.0, parts by weight, based on the overall formulation.

Other waxes, such as polar or nonpolar hydrocarbon waxes, for example, or plant waxes, such as carnauba wax, for example, have less of an influence on pigment dispersion. They may be used as codispersants.

EXAMPLES

Powder coating materials comprising
70.0 parts binder
9.0 parts blanc fixe N
20.0 parts titanium dioxide Kronos 2310
1.0 part ®Hostaperm Red Violet ER 02
0.5 part ®Ceridust 5551
70.0 parts binder
9.0 parts blanc fixe N
20.0 parts titanium dioxide Kronos 2310
1.0 part Hostaperm Red Violet ER 02
1.0 part Ceridust 5551
70.0 parts binder
9.0 parts blanc fixe N
20.0 parts titanium dioxide Kronos 2310
1.0 part Hostaperm Red Violet ER 02
2.0 parts Ceridust 5551
70.0 parts binder
9.0 parts blanc fixe N
20.0 parts titanium dioxide Kronos 2310
1.0 part ®Hostaperm Blue A4R
0.5 part Ceridust 5551
70.0 parts binder
9.0 parts blanc fixe N
20.0 parts titanium dioxide Kronos 2310
1.0 part Hostaperm Blue A4R
1.0 parts Ceridust 5551
70.0 parts binder
9.0 parts blanc fixe N
20.0 parts titanium dioxide Kronos 2310

1.0 part Hostaperm Bleu A4R
2.0 parts Ceridust 5551
blanc fixe N=barium sulfate
Ceridust 5551=montan ester wax
were prepared by means of the following process steps:
premixing the components in a Mixaco mixer
extruding the mixture in an APV Baker twin-screw laboratory extruder at 110° C.
comminuting the extrudate in a Retsch pin mill
sieving to a particle size of less than 125 μm
The binder is composed of:
90.13% ®Alftalat AN 989 (polyester resin, Vianova Resins)
4.74% ®Primid XL 552 (P-hydroxyalkylamine, EMS Chemie)
4.37% ®Additol XL 9824 (leveling agent, Vianova Resins)
0.29% benzoin
0.47% ®Hostanox M 101 (antioxidant, Clariant GmbH)
Characteristics of Ceridust 5551:
dropping point: 100° C.
acid number: 15 mg KOH/g
density (at 20° C.): 1.00 g/cm$^3$
average particle size: 9 μm The powder was applied to metal substrates using an electrostatic spraying apparatus from Wagner and baked at 180° C. for 10 minutes. The color strength of the coating was measured to DIN 55986 on a Minolta CM 3600d spetrophotometer. In order to calculate the relative color strength, the measurement was related to the measurement of the blank sample (without dispersant; blank sample=100%). Figures higher than 100 denote higher color strength, less than 100 lower color strength, than the blank sample.

| Dispersant based on montanic acids parts by weight | Hostaperm Red Violet ER 02 rel. color strength % | Hostaperm Blue A4R rel. color strength % |
| --- | --- | --- |
| 0 | 100 | 100 |
| 0.5 | 108 | 114 |
| 1.0 | 120 | 123 |
| 2.0 | 127 | 132 |

It was found that by adding montanic acid derivatives as dispersants, pigment dispersion is improved and thus the color strength is increased.

What is claimed is:

1. A process for preparing pigmented powder coating material comprising the step of admixing to the powder coating material a montanic acid derivative as dispersant, wherein the montanic acid derivative is selected from the group consisting of a montanic acid ester, montanic acid amide and montanic acid salt, and wherein the powder coating material includes a binder and wherein the binder includes a polyester resin.

2. A powder coating material comprising at least one binder, at least one pigment, and at least one dispersant, wherein said at least one dispersant is a montanic acid derivative selected from the group consisting of a montanic acid ester, montanic acid amide and montanic acid salt, wherein the at least one binder includes a polyester resin.

3. The powder coating material of claim 2, further comprising at least one additive.

4. A powder coated article comprising the powder coating material as claimed in claim 2.

5. A powder coating material made in accordance with the process of claim 1.

6. A method for increasing the dispersion of pigment in a pigmented powder coating material comprising the step of adding a dispersant to the powder coating material, wherein the dispersant is a montanic acid derivative selected from the group consisting of a montanic acid ester, montanic acid amide and montanic acid salt.

7. The method of claim 6, wherein the powder coating material includes at least one binder and the at least one binder includes a polyester resin.

8. A pigmented powder coating material made in accordance with the process of claim 6.

9. A powder coated article comprising the pigmented powder coating material as claimed in claim 8.

* * * * *